M. C. Younglove,
Grain Drill.
No. 4,307. Reissued Mar. 21. 1871.
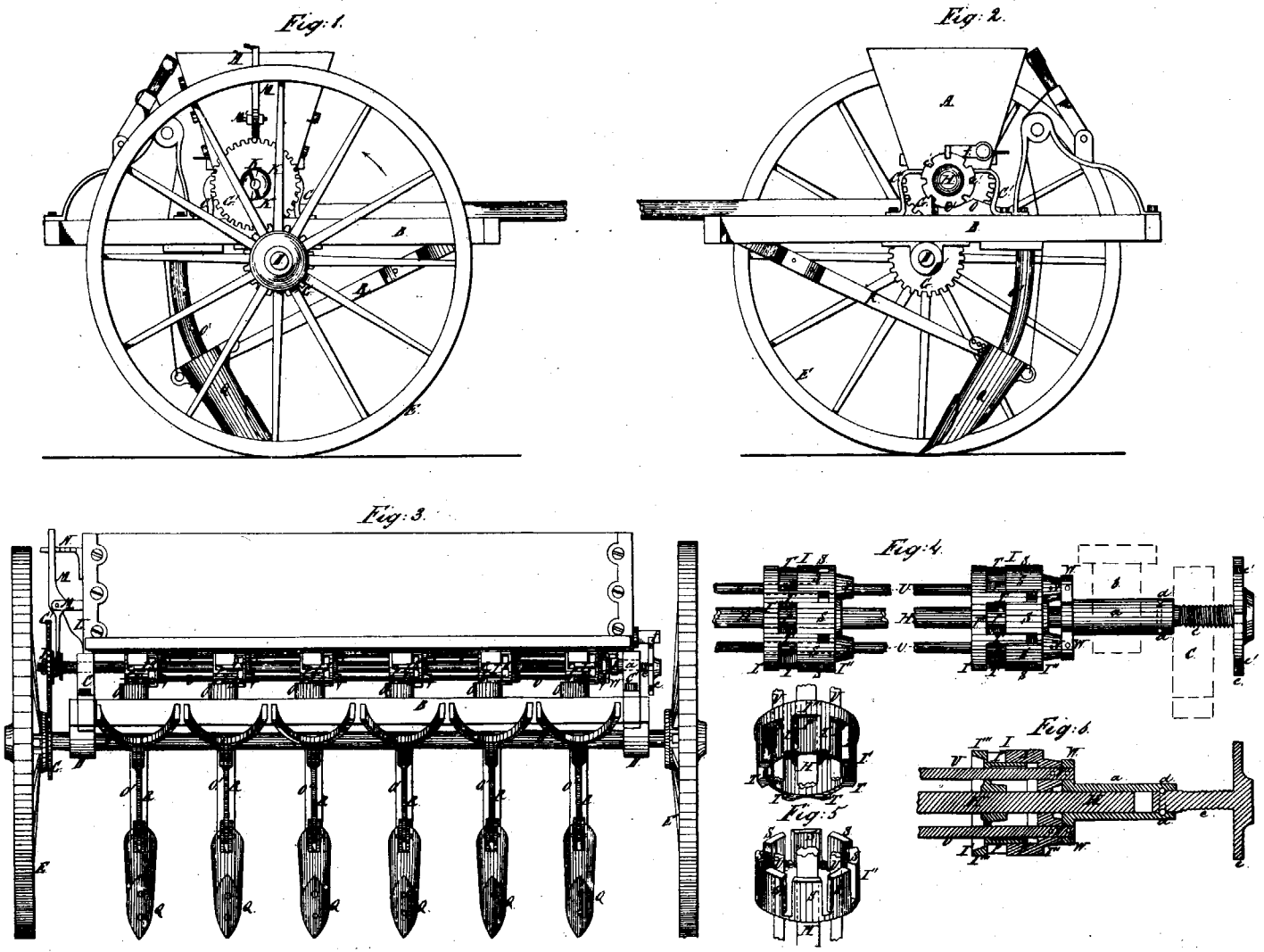
N. PETERS, PHOTO-LITHOGRAPHER, WASHINGTON, D. C.

United States Patent Office.

FREDERICK H. MANNY, OF ROCKFORD, ILLINOIS, ASSIGNEE OF MOSES C. YOUNGLOVE.

Letters Patent No. 20,603, dated June 15, 1858; reissue No. 4,307, dated March 21, 1871.

IMPROVEMENT IN SEED-DRILLS.

The Schedule referred to in these Letters Patent and making part of the same.

*To all whom it may concern:*

Be it known that I, MOSES C. YOUNGLOVE, of Cleveland, in the county of Cuyahoga and State of Ohio, have invented certain new and useful Improvements in Seed-Drills, of which the following is a specification.

My invention relates to that class of seeding-machines in which adjustable seed-cups are mounted upon a rotating shaft. Its object is to enable the attendant simultaneously and uniformly to vary the area of the seed-cups to vary the quantity of seed sown per acre; and The improvements herein claimed consist in certain novel combinations of mechanism hereinafter fully dedescribed for accomplishing this object.

In the accompanying drawings of my improved machine—

Figure 1 is a plan, with some of the slides open to show the cuts.

Figure 2, a front elevation, partly in section, at the line *x x* of fig. 1.

Figure 3, an elevation as seen from the right side of the machine.

Figure 4, an elevation of the hopper and adjusting-wheel, as seen from the left side of the machine.

Figure 5, a vertical transverse section through the machine through the line *y y* of fig. 1.

Figure 6, views in perspective of the seed-cups, showing the details of their construction.

Figure 7, a vertical longitudinal central section through one of the seed-cups.

That side of the machine which would be on the right of a person standing behind the machine and looking toward the tongue I call the right side, the other I call the left side.

The drawings show the hopper or seed-box A, supported at each end upon braces or brackets C C′, which rest upon the frame B.

The brackets connect the frame and hopper securely, and support the latter above the former at such a height as to leave ample space between the two for the location of the shaft which carries the seed-cups, the cups themselves, and the mechanism by which they are simultaneously and uniformly adjusted.

The frame B, which may be constructed in any suitable manner, is mounted upon an axle, D, which is connected with the frame by boxes or bearings D′.

The supporting-wheels E E′ are mounted on this axle. One, E, of these wheels is permanently secured thereto; the other should be left free to revolve independently of the axle.

A spur-gear, G, mounted upon and revolving with the axle or driving-wheel, gears into a corresponding pinion, G′, mounted on the shaft H, of the seeding cylinder or cups I. The spur-pinion or gear G′ is thrown into or out of gear with the wheel G by being moved endwise on its shaft H.

A pin, J, is inserted crosswise into the shaft H.

A clutch or cam, K, is formed in that face of the wheel G′ which is next the pin. This clutch is formed with two inclined faces or planes, each terminating with a depression or notch at *k*, fig. 3, forming two radial lines or ratchets between the cams.

The hand-lever M and spring L, fig. 2, tend constantly to hold the gear G′ against the pin J; consequently, when the driving-wheel E is moving forward, the shoulders or notches *k* bear against the pin and turn the gear and shaft H to drop the seed; but when the machine is backed, the pin J slips over the inclined faces of the cams, and the gears G G′ turn, while the shaft H remains still; consequently no seed is sown when backing the machine.

The shipping-lever M rocks on a fulcrum at *m;* its lower end fits into a groove in a hub on the gear G′, while its upper end takes into a notched arm, N.

When the wheel G′ is to be held out of gear the spring M holds the wheel in gear, when the lever is freed from the arm N, so that the machine may be transported from one place to another without discharging seed from the hopper or operating the cylinders.

The openings through which the seed pass from the hopper to the cylinders may be made in the ordinary manner, and be provided with the usual slides to cut off the grain from the cylinder, which in this instance is composed of a series of adjustable cups hereinafter described.

These cups are arranged below the hopper in direct communication with the openings through which the grain passes from the hopper to the cups, and thence into the chutes O, and through the tubes O′ and spouts Q to the ground.

The spouts are connected with the frame by drag-bars R in the usual manner, and are raised or lowered by ordinary means.

The seed-cylinders or cups I are each divided into sections I′ I″, as shown in figs. 6 and 7. The section I′ has an interior opening or space to avoid weight of metal in the machine.

The section I″, likewise, has a similar space, surrounded by fingers or projections S, with intervening spaces between them, into which spaces ribs T, on the section I′, fit, while the fingers S, in like manner, pass into the spaces P between the ribs, which spaces constitute the cavities of the seed-cups, the sides or walls of which are thus formed by the ribs T, the ends of the projections or fingers S, and the inner side of the rim or flange I‴ on the section I′.

This section is keyed securely on the shaft H, while the other section, I′, slides loosely endwise thereon, by which means the area or capacity of the seed-cups P may be increased or diminished according to the quantity of seed to be sown.

For the purpose of securing instant uniformity in the area or capacity of the cups, or, in other words, to enable them simultaneously and uniformly to be regulated by the attendant, the sections I″ are connected by rods U U, as shown in figs. 2, 6, and 7, which rods pass freely through the fixed sections I′, but are pinned or otherwise secured to the sliding sections I″, as at V, fig. 7, where there are hubs or projections, through which, as well as through the rods, the pins pass.

The rods are secured, in the manner above described, to all the movable sections, and, at their left end, to a movable yoke or stirrup, W, fig. 7, forming part of a flanged thimble or sleeve, *h*, into which the shaft H is inserted, and in which it moves freely.

This sleeve is mounted in bearings *c* in the bracket C′, so as to move freely endwise therein, as well as to revolve.

The other end of the shaft *h* turns in bearings in the bracket C′. The shaft H is thus provided at each end with suitable bearings below the hopper.

A male-screw, *x*, works in a corresponding female-screw in the bracket C′. Pins on the sleeve work in an annular groove on the screw, and thus connect the two, while allowing the sleeve to turn (but not to move endwise) independently of the screw.

A hand-wheel, Y, enables the attendant readily to turn the screw, and a detent, Z, taking into one of a series of notches in the rim of this wheel, holds it in any desired position.

The attendant can thus, by the hand-wheel and screw, move the sleeve in or out, and as all the movable sections of the cups are connected by the rods U with the sleeve, they are all simultaneously and uniformly adjusted on the shaft H by simply turning the hand-wheel, and thus uniformly regulate the area or capacity of all the cups.

When my invention is used it is impossible for the area of the cups to be changed by the resistance of the seed, or even by a stone passing through the cups. Neither can such change be produced by the accidental movement of the screw, even after it has worn loose in its bearings.

Other machines, on the contrary, are liable to have the area of the feed-cups varied without the knowledge of the attendant; consequently, sowing either too much or too little, unless a constant watch is kept.

I am aware that individual seed-cups and separate seed-cylinders, somewhat like mine, have been adjusted by a spring and screw; but this arrangement is complicated, expensive, and inconvenient, and, as each cylinder has separately to be adjusted, there is no certainty of uniform adjustment of the area of the cups.

I am also aware that grooved cylinders for sowing in drills have been connected by rods; but my machine is distinct from this, and from all other prior inventions, in combining a series of cups simultaneously adjusted on a rotating shaft by means of a sliding sleeve, in which the cylinder-shaft is mounted.

I claim as my invention—

1. The combination of the rotating cylinder-shaft, the series of sectional simultaneously-adjustable cups mounted on said shaft, and the rotating endwise-moving sleeve in which the shaft revolves, and by which the cups are adjusted, substantially as hereinbefore set forth.

2. The combination of the revolving cylinder-shaft, the sectional simultaneously-adjustable cups, the rotating endwise-moving sliding sleeve, the adjusting-screw, retaining-wheel, and catch, all these parts being constructed to operate in combination, substantially as hereinbefore set forth.

M. C. YOUNGLOVE.

Witnesses:
GEO. A. GROOT,
S. BURKE.